(12) United States Patent  
Luo et al.

(10) Patent No.: US 8,577,310 B2
(45) Date of Patent: Nov. 5, 2013

(54) SYSTEM AND METHOD FOR TRANSCEIVERS IN A WIRELESS NETWORK

(75) Inventors: Zhi-Quan Luo, Maple Grove, MN (US); Meisam Razaviyayn, Minneapolis, MN (US); Mohammadhadi Baligh, Kanata (CA)

(73) Assignee: FutureWei Technologies, Inc., Plano, TX (US)

( * ) Notice: Subject to any disclaimer, the term of this patent is extended or adjusted under 35 U.S.C. 154(b) by 315 days.

(21) Appl. No.: 12/850,319

(22) Filed: Aug. 4, 2010

(65) Prior Publication Data

US 2011/0195678 A1 Aug. 11, 2011

Related U.S. Application Data (60) Provisional application No. 61/301,869, filed on Feb. 5, 2010.

(51) Int. Cl.
 *H04B 1/04* (2006.01)
(52) U.S. Cl.
 USPC ......... 455/114.2; 455/69; 455/522; 455/63.4; 455/127.2; 455/226.3
(58) Field of Classification Search
 USPC ............ 455/114.2, 114.3, 63.1, 226.3, 278.1, 455/69, 522, 115.1–115.4, 127.2, 135, 136, 455/103–105, 67.13, 553.1, 562.1, 63.4
 See application file for complete search history.

(56) References Cited

U.S. PATENT DOCUMENTS

| 8,150,330 | B2* | 4/2012 | Zhang et al. ............. 455/69 |
| 8,412,128 | B2* | 4/2013 | Zheng et al. ............ 455/101 |
| 2002/0136158 | A1* | 9/2002 | Frank .................... 370/209 |
| 2005/0181833 | A1* | 8/2005 | Lee et al. ............. 455/562.1 |
| 2006/0094373 | A1* | 5/2006 | Hottinen .................. 455/73 |
| 2008/0070564 | A1* | 3/2008 | Li et al. ................. 455/424 |
| 2010/0027688 | A1 | 2/2010 | Suh et al. |

FOREIGN PATENT DOCUMENTS

| CN | 101370240 | 2/2009 |
| CN | 101378299 | 3/2009 |
| CN | 101626260 | 1/2010 |
| JP | 2008072722 | 3/2008 |

OTHER PUBLICATIONS

Goldsmith, A. J., et al., "Design Challenges for Energy-Constrained AD HOC Wireless Networks," Energy-Aware AD HOC Wireless Networks, Aug. 2002, pp. 8-27, IEEE Wireless Communications.

(Continued)

*Primary Examiner* — Edward Urban
*Assistant Examiner* — Rui Hu
(74) *Attorney, Agent, or Firm* — Slater & Matsil, L.L.P.

(57) ABSTRACT

In accordance with an embodiment, a method of operating a multi-output wireless transmitter includes determining a precoded data stream based on input data, where the determining includes determining a signal to interference plus noise ratio (SINR) of a plurality of receivers, determining a channel gain to each of the plurality of receivers, and maximizing a sum of utility functions, wherein each utility function is proportional to the SINR of each of the plurality of receivers at low SINR values and asymptotically approaches a constant value at high SINR values. The precoded data stream is transmitted on the multi-output wireless transmitter.

23 Claims, 6 Drawing Sheets (56) References Cited

OTHER PUBLICATIONS

Haykin, S. "Cognitive Radio: Brain-Empowered Wireless Communications," IEEE Journal on Selected Areas in Communications, Feb. 2005, pp. 201-220, vol. 23, No. 2.
Akyildiz, I. F., et al, "A Survey on Wireless Mesh Networks," IEEE Radio Communications, Sep. 2005, pp. S23-S30.
Cendrillon, R., et al., "Optimal Multiuser Spectrum Balancing for Digital Subscriber Lines," IEEE Transactions on Communications, May 2006, pp. 922-933, vol. 54, No. 5.
Cendrillon, R., et al., "Autonomous Spectrum Balancing for Digital Subscriber Lines," IEEE Transactions on Signal Processing, Sep. 1, 2006, pp. 1-15.
Kobayashi, M., et al., "Iterative Waterfilling for Weighted Rate Sum Maximization in MIMO-OFDM Broadcast Channels," IEEE International Conference on Acoustics, Speech and Signal Processing, Apr. 15-20, 2007, 4 pages.
Luo, Z.-Q., et al, "Dynamic Spectrum Management: Complexity and Duality," IEEE Journal of Selected Topics in Signal Processing, Feb. 2008, pp. 57-73, vol. 2, No. 1.
Cadambe, V. R., et al., "Interference Alignment and Spatial Degrees of Freedom for the $K$ User Interference Channel," IEEE International Conference on Communications, May 19-23, 2008, 30 pages.
Gomadam, K., et al., "Approaching the Capacity of Wireless Networks through Distributed Interference Alignment," IEEE Global Telecommunications Conference, Nov. 30-Dec. 4, 2008, pp. 1-10.
Peters, S. W., et al., "Interference Alignment Via Alternating Minimization," IEEE International Conference on Acoustics, Speech and Signal Processing, Apr. 19-24, 2009, 5 pages.
Scutari, G., et al., "The MIMO Iterative Waterfilling Algorithm," IEEE Transactions on Signal Processing, May 2009, pp. 1917-1935, vol. 57, No. 5.
PCT International Search Report and Written Opinion, PCT/CN2011/070890, Huawei Technologies Co., Ltd. et al., mailed May 19, 2011; 9 pages.

* cited by examiner

SYSTEM AND METHOD FOR TRANSCEIVERS IN A WIRELESS NETWORK

CROSS REFERENCE TO RELATED APPLICATIONS

This patent application claims priority to U.S. Provisional Application No. 61/301,869 filed on Feb. 5, 2010, entitled "System and Method for Transceivers in a Wireless Network," which application is incorporated by reference herein in it's entirety.

TECHNICAL FIELD

The present invention relates generally to wireless communication systems, and more particularly to a system and method for transceivers in a wireless network.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

Some wireless communication systems use multiple-input multiple-output (MIMO) techniques that use multi-output transmitters and receivers to enhance system performance. In such cases, transmitted data is precoded into multiple outputs.

SUMMARY OF THE INVENTION

In accordance with an embodiment, a method of operating a multi-output wireless transmitter includes determining a precoded data stream based on input data, where the determining includes determining a signal to interference plus noise ratio (SINR) of a plurality of receivers, determining a channel gain to each of the plurality of receivers, and maximizing a sum of utility functions, wherein each utility function is proportional to the SINR of each of the plurality of receivers at low SINR values and asymptotically approaches a constant value at high SINR values. The precoded data stream is transmitted on the multi-output wireless transmitter.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, transceivers in wireless networks. Embodiments of the invention may also be applied to transceivers in other types of networks.

Figure 1:
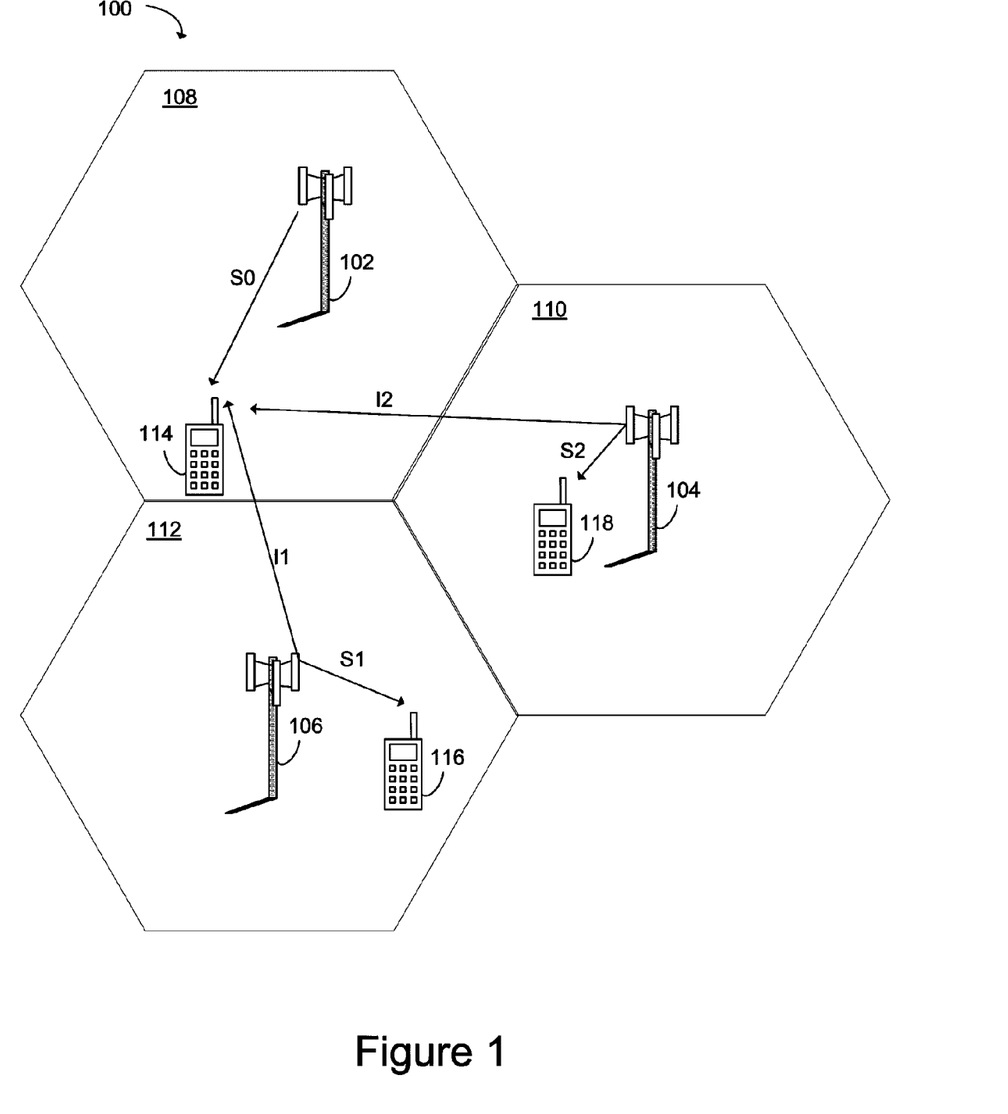
FIG. 1 illustrates a diagram of an embodiment mobile broadband system.

An illustration of an embodiment mobile broadband system 100 is illustrated in FIG. 1. Mobile broadband system 100 is divided into cells 108, 110 and 112, where each cell 108, 110 and 112 has corresponding base station 102, 104 and 106. Mobile terminals or user equipment (UE) 114 and 116 access network 100 through one of base stations 102, 104 and 106. Three base stations 102, 104 and 104 and two UEs 114 and 116 are used for simplicity of illustration, however, multiple cells and UEs can be used and provided for in real systems.

In an embodiment, base station 102 in cell 108 transmits with a power S0 to UE 114 in a downlink channel. Base station 106 in cell 112 transmits to UE 116 with a power S1, which appears to UE 114 as interference signal I1. Similarly, base station 104 in cell 110 transmits to UE 118 with a power S2, which appears to UE 114 as interference signal I2.

Figure 2:
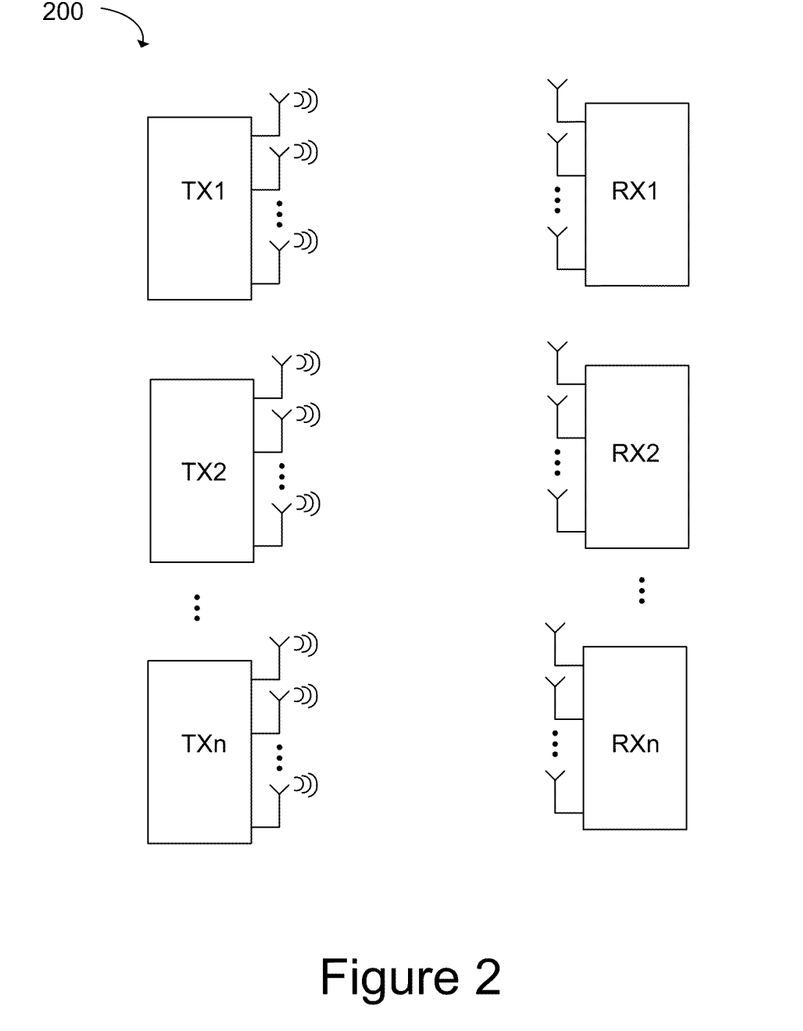
FIG. 2 illustrates an embodiment MIMO system.

In an embodiment, multiple antennas are used at both the transmitters and receivers of the system to improve system performance according to a multiple-input and multiple-output scheme (MIMO), as illustrated in system 200 of FIG. 2. System 200 has a plurality of transmitters TX1, TX2 to TXn and a plurality of receivers RX1, RX2 to RXn. In an embodiment, any number of transmitters and any number of receivers can be present in system 200. Each transmitter TX1, TX2 to TXn and each receiver RX1, RX2 to RXn has a plurality of antennas. In embodiment system illustrated in FIG. 2, spatial diversity, using, for example, beam forming techniques, is used to improve system performance. In alternative embodiments of the present invention, other MIMO schemes can be used, for example, time diversity and channel diversity using multiple tones/time slots or a combination thereof.

Figure 3:
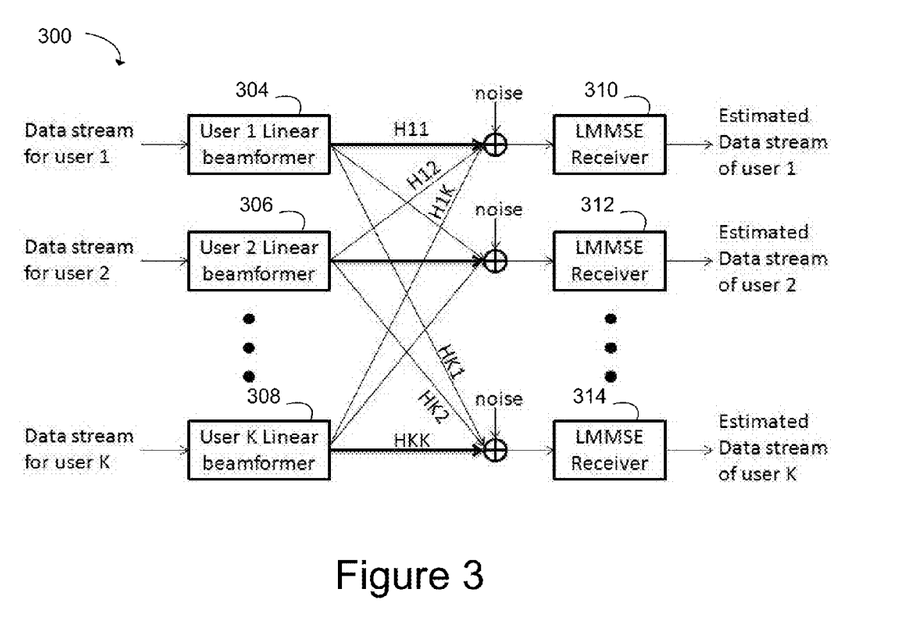
FIG. 3 illustrates an embodiment communication system.

FIG. 3 illustrates embodiment system 300 having transmitters 304, 306 and 308 and receivers 310, 312 and 314. Transmitters 304, 306 and 308 are implemented using linear beamformers, and receivers 310, 312 and 314 are implemented using linear minimum mean square error (LMMSE) receivers. Each transmitter 304, 306 and 308 transmits a user data stream using beamforming techniques, for example, using a precoder to transmit multiple signals on multiple antennas. Each receiver 310, 312 and 314 receives transmissions via multiple antennas and uses LMMSE techniques to provide estimate user streams. The channels from transmitters 304, 306 and 308 to receiver 310 is represented by H11, H12 and H1K, respectively, and the channels from transmitters 304, 306 and 308 to receiver 314 is represented by HK1, HK2 and HKK, respectively.

In an embodiment, K pairs of transmitters and receivers each has multiple transmit antennas (or equivalently, multiple tones/time slots or a combination thereof), and each transmitter has access to the data stream for its intended receiver. In an embodiment, channel state information is known among all nodes. The system operates according a goal of finding linear transmit precoders and receive postcoders. In some embodiments, non-linear precoders or postcoders such as dirty paper coding or successive interference cancellation are used on top of the linear system. In other embodiments, multi-group multicasting systems can also be implemented using embodiment techniques.

In an embodiment, a class of utility functions is used that contains the following objective function for the q-th data stream of the k-th user:

$$\tilde{\gamma}_k^q = \frac{\gamma_k^q}{1+\gamma_k^q},$$

where $\gamma_k^q$ is the SINR value of the q-th stream for the k-th user. In embodiments, this class of utility functions captures the interference alignment condition in high SNR, as well as achieving fairness among different data streams. At each time slot, each user updates it's transmit covariance matrix in order to maximize the sum of the utility functions over different data streams and different users in embodiments. LMMSE (Linear Minimum Mean Square Error) techniques are used to decode data streams at the receiver, and in alternative embodiments, a utility function can be used that is proportional to the SINR at low SINR values and asymptotically approaches a constant value at high SINR values. For example, a utility function such as $$\frac{\gamma_k^q}{p+\gamma_k^q}$$

can be used where p is a constant.

In one embodiment, the following utility function derived from the above expression is maximized to provide precoding:

$$\tilde{f}_k = Tr\left[H_{kk}Q_kH_{kk}^T\left(\sigma^2I + \sum_{l=1}^{k}H_{kl}Q_lH_{kl}^T\right)^{-1}\right].$$

In some embodiments that maximize the above utility function, log detectors and beamformers (number of datastreams to transmit, SVD) are not required. In other embodiments, however, log detectors and beamformers can be used.

In one embodiment method, the utility function is maximized such that $$\max_{Q_k} Tr\left[H_{kk}Q_kH_{kk}^T\left(\sigma^2I + \sum_{l=1}^{K}H_{kl}Q_lH_{kl}^T\right)^{-1}\right]$$

s.t. $Tr(Q_k) \le p_k$ $Q_k \succeq 0.$

In an embodiment, $H_{kk}$ represents the channel and each transmitter optimizes beamforming matrix $Q_k$. The Expression within the inverse brackets represents the power at the $k_{th}$ receiver. In an example embodiment, the transmitter can be a implemented within a base station and the receiver implemented within a user device, such as a cellular phone or other network access device such as a computer. In embodiments, superscript T denotes a transpose operation in real signaling and hermitian transpose in complex signaling.

In such an embodiment, the utility function is maximized within processing within the base station. The base station gathers knowledge of received power and channel conditions, for example, by polling receivers and/or adjoining base stations. In alternative embodiments, transmitters and receivers can be implemented by any combination of fixed or mobile device. In one embodiment, the above expression can be maximized using known convex optimization techniques.

In an embodiment using a LMMSE receiver and the above utility function for each data stream, the summation of all utility functions over different data streams is:

$$\sum_{j=1}^{K}\alpha_j Tr\left[H_{jj}Q_jH_{jj}^H\left(\sigma^2I + \sum_{l=1}^{K}H_{jl}Q_lH_{jl}^H\right)^{-1}\right],$$

where $H_{jl}$ is the channel gain from user l to user j, $\alpha_j$ is the priority weight of user j, and $Q_j$ is the transmit covariance matrix of transmitter j.

In an embodiment of the present invention, the problem can be cast into Semidefinite Programming (SDP) form using a concave lower bound:

$$\min_{Q_k,Y} \alpha_k Tr[Y] + Tr[B_kQ_k]$$

s.t. $Tr(Q_k) \le p_k$ $Q_k \succeq 0,$ $$\begin{bmatrix} C_{kk}H_{kk}Q_kH_{kk}^T & C_{k,k}^{\frac{1}{2}} \\ C_{k,k}^{\frac{1}{2}} & Y \end{bmatrix} \succeq 0.$$

where, $$C_{k,k} \triangleq \sum_{l\ne k}^{K} H_{kl}Q_lH_{kl}^T,$$

and $\alpha_k$ is the priority weight of user k.

In the above example, each transmitter k uses knowledge of received power $C_{kk}$, and the following matrix, which represents the coefficient of interference caused by user k on other users after MMSE receiver:

$$B_k \triangleq \sum_{j \neq k} \alpha_j H_{jk}^T (C_{j,k} + H_{jk}\tilde{Q}_k H_{jk}^T)^{-1} H_{jj} Q_j H_{jj}^T (C_{j,k} + H_{jk}\tilde{Q}_k H_{jk}^T)^{-1} H_{jk}.$$

In an embodiment, the optimization is performed at transmitter, or is performed on a processor associated with the transmitter based on updates from receivers. Alternatively, the optimization can be performed by a device or processor remotely located from the transmitter. In a further embodiment, the optimization is performed at the receiver, and the solution of the optimization problem is sent from the receiver back to the transmitter.

In an alternative embodiment the SDP form can be formulated as follows:

$$\min_{Q_k, Y} \alpha_k Tr[Y] + Tr[B_k Q_k]$$

$$\text{s.t. } Tr(Q_k) \leq p_k \quad Q_k \succcurlyeq 0,$$

$$\begin{bmatrix} C_{kk} H_{kk} Q_k H_{kk}^T & C_{k,k}^{\frac{1}{2}} \\ C_{k,k}^{\frac{1}{2}} & Y \end{bmatrix} \succcurlyeq 0,$$

where, $$C_{j,k} \triangleq \sigma^2 I + \sum_{l \neq k} H_{jl} Q_l H_{jl}^T, \text{ and}$$

$$B_k \triangleq \sum_{j \neq k} \alpha_j H_{jk}^T (C_{j,k} + H_{jk}\tilde{Q}_k H_{jk}^T)^{-1} H_{jj} Q_j H_{jj}^T (C_{j,k} + H_{jk}\tilde{Q}_k H_{jk}^T)^{-1} H_{jk},$$

where σ is the noise standard deviation.

In an embodiment, regularization techniques are used for updating the transmit covariance matrix. For example:

$$Q_k \leftarrow \alpha Q_k^* + (1-\alpha)\tilde{Q}_k$$

where $0 < \alpha \leq 1$ is the regularization factor and $Q_k^*$ is the value found for the transmit covariance matrix after solving the optimization problem and $\tilde{Q}_k$ is the previous value for the transmit covariance matrix.

In an embodiment, an unselfish approach can also be used, i.e., solving the following optimization problem at each iteration:

$$\min_{Q_k} Tr[B_k Q_k]$$

$$\text{s.t. } Tr(Q_k) = p_k \quad Q_k \succcurlyeq 0.$$

Figure 4:
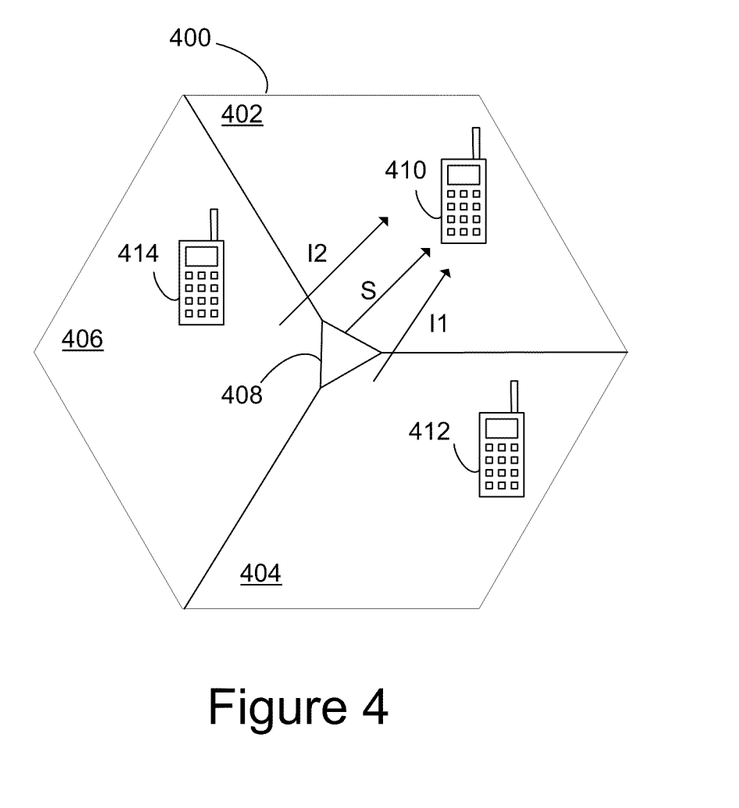
FIG. 4 illustrates an embodiment mobile broadband system, in which embodiment algorithms are applied within sectors of a base station.

In a further embodiment, embodiment methods can also be applied to a single base station having multiple sectors. FIG. 4 illustrates an embodiment cell 400 in which an embodiment precoding approach is applied among multiple sectors 402, 404 and 406 of the same service cell 400 having UEs 410, 412 and 414, respectively. Base station 408 transmits desired signal S to UE 410. Sectors 404 and 406 transmit interfering signals I1 and I2 respectively. Channel and receiver SINR information is shared among base station 408 in cell 400.

Figure 5:
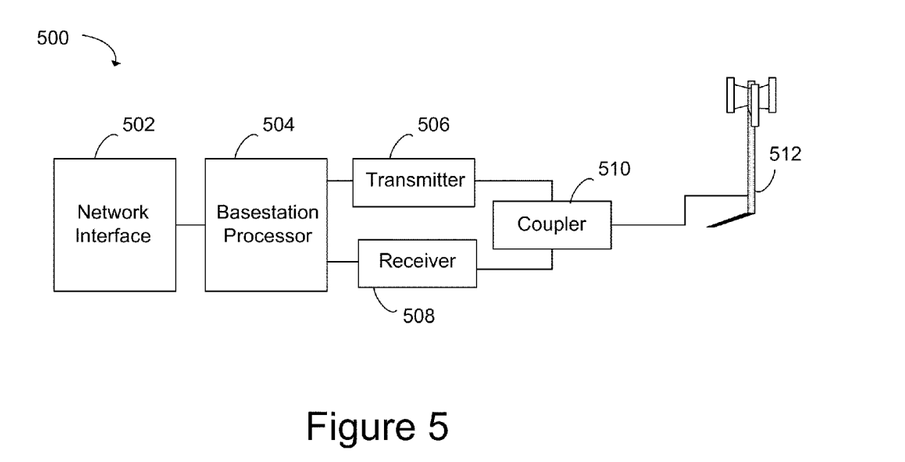
FIG. 5 illustrates a block diagram of an embodiment base station.

A block diagram of an embodiment base station 500 is illustrated in FIG. 5. Base station 500 has a base station processor 504 coupled to transmitter 506 and receiver 508, and network interface 502. Transmitter 506 and receiver 508 are coupled to antenna 512 via coupler 510. Base station processor 504 executes embodiment methods and algorithms. In an embodiment of the present invention, base station 500 is configured to operate in a LTE network using an OFDMA downlink channel divided into multiple subbands or subcarriers and using single carrier FDMA in the uplink. In alternative embodiments, other systems, network types and transmission schemes can be used, for example, 1XEV-DO, IEEE 802.11, IEEE 802.15 and IEEE 802.16.

Figure 6:
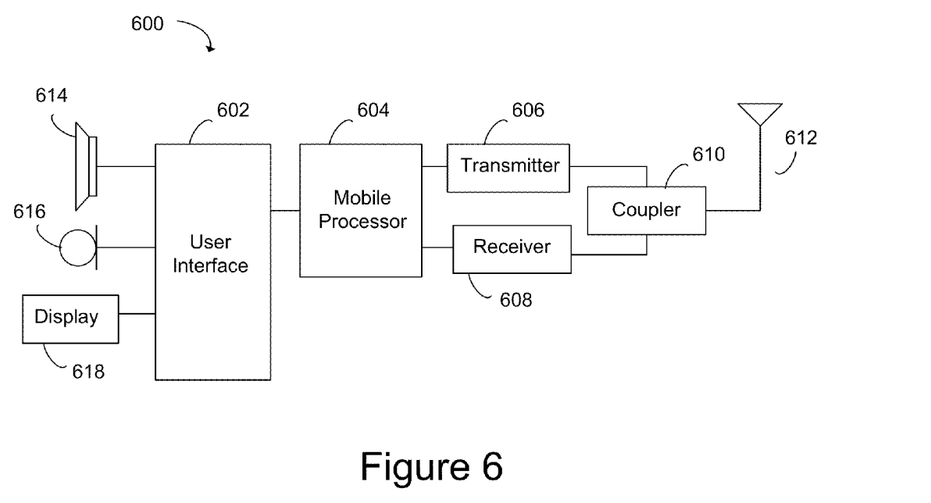
FIG. 6 illustrates a block diagram of an embodiment user device.

A block diagram of an embodiment user device 600 is illustrated in FIG. 6. User device 600 can be, for example, a cellular telephone or other mobile communication device, such as a computer or network enabled peripheral. Alternatively, user device 600 can be a non-mobile device, such as a desktop computer with wireless network connectivity. User device 600 has mobile processor 604, transmitter 606 and receiver 608, which are coupled to antenna 612 via coupler 610. User interface 602 is coupled to mobile processor 604 and provides interfaces to loudspeaker 614, microphone 616 and display 618, for example. Alternatively, user device 600 may have a different configuration with respect to user interface 602, or user interface 602 may be omitted entirely. In embodiment, user device is configured to operate according to embodiment algorithms. For example, mobile processor 604 is configured to operate as a LMMSE receiver.

Figure 7:
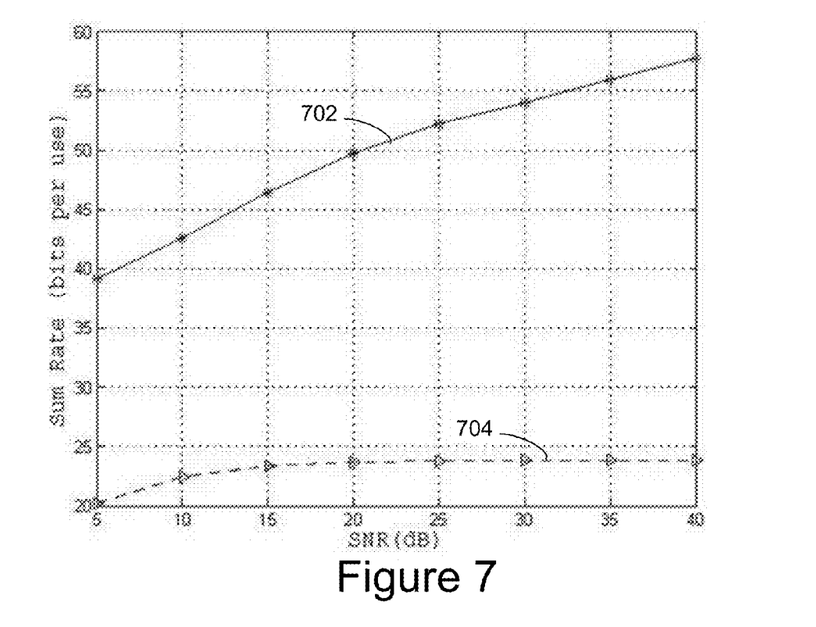
FIG. 7 illustrates an embodiment performance graph.

FIG. 7 illustrates performance graphs of Sum Rate in bits per line with respect to SNR for an embodiment method 702 and a conventional Decentralized Interference Alignment (DIA) method 704 in which numerical results are averaged over 20 channel realizations. In each channel realization, the channel coefficients are drawn from zero mean unit variance i.i.d. Gaussian random variable. Linear MMSE receivers and equal power budgets are considered for all users. To implement DIA, degrees of freedom (DoF) are predetermined for all users. In all simulations $d_k$'s are set to be equal for all users. In FIG. 7, K=20 users, where each use is equipped with M=6 antennas. The predetermined degrees of freedom used in a DIA method is set to $d_1=d_2=\ldots=d_K=d=1$. FIG. 7 represents the sum rate comparison between the proposed method and the DIA method.

Figure 8:
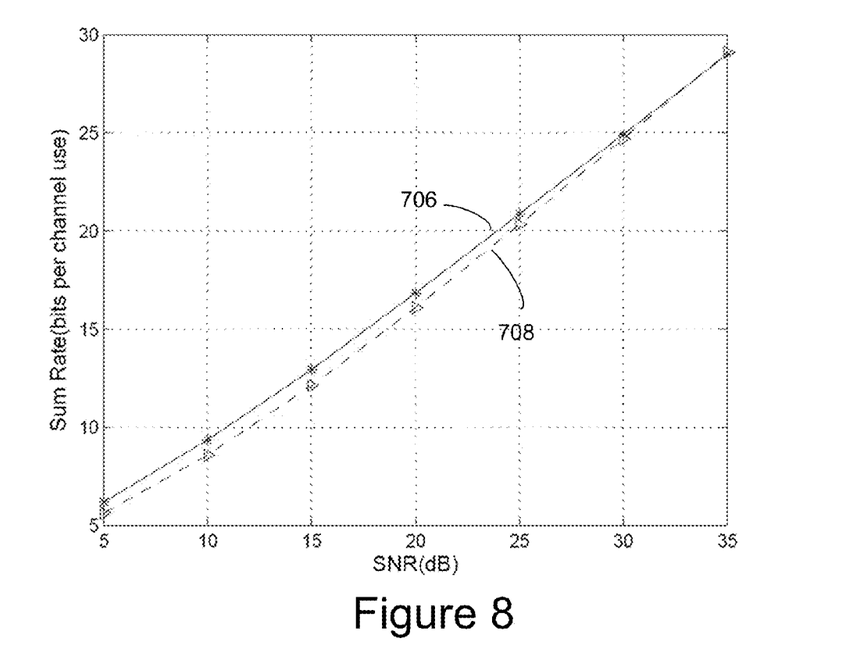
FIG. 8 illustrates an additional embodiment performance graph.

FIG. 8 illustrates performance graphs of sum rate in bits per line with respect to SNR for an embodiment method 706 and a conventional DIA method 708 where the number of users is K=3, and each node is equipped with M=2 antennas and $d_1=d_2=d_3=1$. The embodiment approach is implemented using:

$$Q_k \leftarrow \alpha Q_k^* + (1-\alpha)\tilde{Q}_k,$$

with α=0.5, and updating the covariance matrix using:

$$\min_{Q_k} Tr[B_k Q_k]$$

$$\text{s.t. } Tr(Q_k) = p_k \quad Q_k \succcurlyeq 0.$$

The results are averaged sum rates over 50 random channel realizations.

In a further embodiment, each user k first updates its auxiliary variable $W_k$ according to the following update rule:

$$W_k = \left( I - H_{kk} Q_k H_{kk}^T \left( \sigma^2 I + \sum_{l=1}^{K} H_{kl} Q_l H_{kl}^T \right)^{-1} \right)^{-1},$$

$$\forall k = 1, 2, \ldots, K.$$

In alternative embodiments, $W_k$=the identity matrix I or $W_k$=1. The transmit covariance matrix of each user is then updated by solving the following optimization problem:

$$\min_{Q_k, Y} \alpha_k Tr[Y] + Tr[B_k Q_k]$$

$$\text{s.t. } Tr(Q_k) \le p_k, Q_k \succcurlyeq 0$$

$$\begin{bmatrix} C_{kk} + H_{kk} Q_k H_{kk}^T & (W_k C_{kk})^{\frac{1}{2}} \\ (W_k C_{kk})^{\frac{1}{2}} & Y \end{bmatrix} \succcurlyeq 0,$$

where $$B_k \triangleq \sum_{j \ne k} H_{jk}^T (C_{jk} + H_{jk} \tilde{Q}_k H_{jk}^T)^{-1} \alpha_j W_j H_{jj} Q_j H_{jj}^T (C_{jk} + H_{jk} \tilde{Q}_k H_{jk}^T)^{-1} H_{jk},$$

and $\alpha_j$ is the weight of user j.

In an embodiment, the above algorithm is implemented by first setting $$Q_k = \frac{p_k}{M_k} I$$

and $W_k = I$, for all, where $p_k$ is user k's power budget and $M_k$ is the number of antennas at transmitter k. The following steps are repeated k=1, 2, . . . , K until convergence is reached or $\|\tilde{Q} - Q\| \le \epsilon$:

a. set $$W_k = \left( I - H_{kk} Q_k H_{kk}^T \left( \sigma^2 I + \sum_{l=1}^{K} H_{kl} Q_l H_{kl}^T \right)^{-1} \right)^{-1},$$

$$\forall k = 1, 2, \ldots, K;$$

b. update $Q_k$ by solving:

$$W_k = \left( I - H_{kk} Q_k H_{kk}^T \left( \sigma^2 I + \sum_{l=1}^{K} H_{kl} Q_l H_{kl}^T \right)^{-1} \right)^{-1},$$

$$\forall k = 1, 2, \ldots, K.$$

c. update $$\min_{Q_k, Y} \alpha_k Tr[Y] + Tr[B_k Q_k]$$

$$\text{s.t. } Tr(Q_k) \le p_k, Q_k \succcurlyeq 0$$

$$\begin{bmatrix} C_{kk} + H_{kk} Q_k H_{kk}^T & (W_k C_{kk})^{1/2} \\ (W_k C_{kk})^{1/2} & Y \end{bmatrix} \succcurlyeq 0;$$

In an embodiment employing an unselfish approach, each user k updates its auxiliary variable $W_k$ according to:

$$W_k = \left( I - H_{kk} Q_k H_{kk}^T \left( \sigma^2 I + \sum_{l=1}^{K} H_{kl} Q_l H_{kl}^T \right)^{-1} \right)^{-1},$$

$$\forall k = 1, 2, \ldots, K.$$

In alternative embodiments, $W_k$=the identity matrix I or $W_k$=1. The transmit covariance matrix of each user is then updated by solving the following optimization problem:

$$\min_{Q_k} Tr[B_k Q_k] \text{ s.t. } Tr(Q_k) = p_k \ Q_k \succcurlyeq 0.$$

In an embodiment, if the degrees of freedom (DoF) of each user is known a-priori and equal power is allocated across the data streams, we the transmit beamformer of user k can be updated by solving the following optimization problem:

$$\min_{V_k} Tr[V_k^T B_k V_k]$$

$$\text{s.t. } V_k^T V_k = \frac{p_k}{d_k} I.$$

In an embodiment, this approach lets each transmitter use maximum power and pick a transmit covariance matrix $V_k$ so as to minimize the total interference to other users. It has a closed form solution $V_k$ whose columns are proportional to the eigenvectors of $B_k$ corresponding to its $d_k$ smallest eigen values, scaled appropriately to satisfy the power budget constraint.

In an embodiment, the above algorithm is implemented by first initializing $V_k$=0 and $W_k$=I, for all k=1, 2, . . . , K, and then repeating the following steps for k=1, 2, . . . , K until convergence:

a. update $V_k$ by solving:

$$\min_{V_k} Tr[V_k^T B_k V_k]$$

$$\text{s.t. } V_k^T V_k = \frac{p_k}{d_k} I;$$

and b. update $$W_k = \left( I - H_{kk} Q_k H_{kk}^T \left( \sigma^2 I + \sum_{\ell=1}^{K} H_{k\ell} Q_\ell H_{k\ell}^T \right)^{-1} \right)^{-1}, \forall k = 1, 2, \cdots, K.$$

In a further embodiment, a K user MIMO interference channel is considered where each user k is equipped with $T_k$ transmit antennas and $R_k$ receive antennas. Assuming a linear channel between the transceivers, the received signal of user k can be written as:

$$y_k = H_{kk} x_k + \sum_{j \ne k} H_{kj} x_j + n_k,$$

where $x_k \in \mathbb{C}^{T_k \times 1}$ is the transmitted signal of user k and $y_k \in \mathbb{C}^{R_k \times 1}$ is the received signal at receiver k. The matrix $H_{kj} \in \mathbb{C}^{R_k \times T_j}$ represents the channel matrix from the transmitter j to receiver k, while $n_k \in \mathbb{C}^{R_k \times T_j}$ denotes complex additive white Gaussian noise with power $\sigma_k^2$.

Using transmit beamformer $V_k$ and the receive beamformer $U_k$ $U_k$ in order to maximize the weighted sum throughput in the system, the following optimization problem is considered:

$$\max_{U,V} \sum_k \alpha_k \log$$

$$\det\left(I + U_k^T H_{kk} V_k V_k^T H_{kk}^T U_k \left(\sum_{j\neq k} U_k^T H_{kj} V_j V_j^T H_{kj}^T U_k + \sigma_k^2 U_k^T U_k\right)^{-1}\right).$$

By further introducing new optimization variables $W_1$, $W_2, \ldots, W_K$, the above optimization problem can be rewritten as:

$$\min_{U,V,W} \sum_k \alpha_k (Tr[W_k E_k] - \log\det W_k),$$

where $E_k$ is the mean square error for user k:

$$E_k = (I - U_k^T H_{kk} V_k)(I - U_k^T H_{kk} V_k)^T + \sum_{j\neq k} U_k^T H_{kj} V_j V_j^T H_{kj}^T U_k + \sigma_k^2 U_k^T U_k.$$

In an embodiment, different optimization constraints can be used, for example, the following transmit power constraint:

$$Tr(V_k V_k^T) \leq P_k.$$

In one embodiment, the values of $V_k$, $U_k$ and $W_k$ are updated iteritively according to the following method. First, initialize $V_1, V_2, \ldots, V_k$ such that $Tr(V_k V_k^T) \leq P_k$ for all k. Next, the following steps are repeated until $$\left|\sum_{j=1}^K \alpha_j \log\det W_j - \sum_{j=1}^K \alpha_j \log\det W_j'\right| \leq \varepsilon:$$

a. $U_k \leftarrow \left(\sum_{j=1}^K H_{kj} V_j V_j^T H_{kj}^T + \sigma_k^2 I\right)^{-1} H_{kk} V_k$ for all $k$;

b. $W_k' \leftarrow W_k$ for all $k$;

c. $W_k = (I - U_k^T H_{kk} V_k)^{-1}$ for all $k$; and d. $V_k = \alpha_k \left(\sum_{j=1}^K \alpha_j H_{jk}^T U_j W_j U_j^T H_{jk} + \mu_k I\right)^{-1} H_{kk}^T U_k W_k$ for all $k$.

In the above algorithm, $\mu_k \leq 0$ is a Lagrange variable that can be calculated by one-dimensional search methods, for example, bisection, such that transmit power constraints are satisfied.

In an embodiment, a method of operating a multi-output wireless transmitter includes determining a precoded data stream based on input data, where the determining includes determining a signal to interference plus noise ratio (SINR) of a plurality of receivers, determining a channel gain to each of the plurality of receivers, and maximizing a sum of utility functions, wherein each utility function is proportional to the SINR of each of the plurality of receivers at low SINR values and asymptotically approaches a constant value at high SINR values. The embodiment method also includes transmitting the precoded data stream on the multi-output wireless transmitter. In a further embodiment method the utility function is expressed as $$\frac{\gamma}{p+\gamma},$$

where p comprises a constant and γ comprises a SINR.

In a further embodiment method, the multi-output transmitter comprises a multi-antenna beam forming transmitter and/or a multi-time slot transmitter.

In a further embodiment method, determining the precoded transmit data includes solving the following optimization problem:

$$\max_{Q_k} Tr\left[H_{kk} Q_k H_{kk}^T \left(\sigma^2 I + \sum_{l=1}^K H_{kl} Q_l H_{kl}^T\right)^{-1}\right]$$

s.t. $Tr(Q_k) \leq p_k$  $Q_k \geq 0$, where $H_{kk}$ is the channel matrix from transmitter k (after the precoded data) to receiver k, $H_{kl}$ is the channel from transmitter l (after the precoded data) to receiver k, $Q_k$ is the precoded transmit data covariance matrix of user k, $Q_l$ is the precoded transmit data covariance matrix of user l, and $p_k$ is the power constraint of precoded data of user k.

In a further embodiment method, determining the precoded transmit data includes solving the following optimization problem:

$$\max_{Q_k} \alpha_k Tr\left[H_{kk} Q_k H_{kk}^T \left(\sigma^2 I + \sum_{l=1}^K H_{kl} Q_l H_{kl}^T\right)^{-1}\right] +$$

$$\sum_{j\neq k} \alpha_j Tr\left[H_{jj} Q_j H_{jj}^T \left(\sigma^2 I + \sum_{l=1}^K H_{jl} Q_l H_{jl}^T\right)^{-1}\right]$$

s.t $Tr(Q_k) \leq p_k$  $Q_k \geq 0$, where $H_{kk}$ is the channel matrix from transmitter k (after the precoded data) to receiver k, $H_{kl}$ is the channel matrix from transmitter l (after the precoded data) to receiver k, $H_{jj}$ is the channel matrix from transmitter j (after the precoded data) to receiver j, $H_{jl}$ is the channel matrix from transmitter l (after the precoded data) to receiver j, $Q_k$ is the precoded transmit data covariance matrix of user k, $Q_l$ is the precoded transmit data covariance matrix of user l, and $p_k$ is the power constraint of precoded data of user k.

A further embodiment method further includes receiving the transmitted precoded data stream with a linear minimum mean square error receiver. Also, in an embodiment method, a base station processor performs the determining the precoded data. In an embodiment method, determining the a signal to interference plus noise ratio (SINR) of a plurality of receivers, comprises polling the plurality of receivers.

In an embodiment, a method of operating a wireless base station includes determining a signal to interference plus noise ratio (SINR) of a plurality of receivers, determining a channel gain to each of the plurality of receivers, and determining a precoded data stream based on input data, where determining the precoded data stream includes solving the following optimization problem:

$$\max_{Q_k} Tr\left[H_{kk} Q_k H_{kk}^T \left(\sigma^2 I + \sum_{l=1}^{K} H_{kl} Q_l H_{kl}^T\right)^{-1}\right]$$

s.t $Tr(Q_k) \leq p_k$   $Q_k \succeq 0$, where $H_{kk}$ is the channel matrix that shows the effect of user k's signal on user j's receive signal, $H_{kl}$ is the channel matrix that shows the effect of signal for user k on receiver j, $Q_k$ is the covariance matrix for the transmit signal of user k, $Q_l$ is the transmit covariance matrix of user l, and $p_k$ is user k's power budget. An embodiment method also includes transmitting the precoded data stream on a multi-output wireless transmitter. In an embodiment, the multi-output wireless transmitter comprises a multi-antenna beam forming transmitter and/or at least one of the plurality of receivers comprises a cellular telephone.

In an embodiment, a multi-output transmission device includes a base station processor configured to determine a precoded data stream based on input data, determine a signal to interference plus noise ratio (SINR) of a plurality of receivers, determine a channel gain to each of the plurality of receivers, and maximize a sum of utility functions, wherein each utility function is proportional to the SINR of each of the plurality of receivers at low SINR values and asymptotically approaches a constant value at high SINR values. In a further embodiment, wherein the utility function is expressed as $$\frac{\gamma}{p+\gamma},$$

where p comprises a constant and γ comprises a SINR. Alternatively the utility function can be further expressed as $$\frac{q\gamma}{p+\gamma},$$

where q is a multiplicative constant. In a further embodiment, the multi-output transmitter comprises a multi-antenna beam forming transmitter and/or a multi-time slot transmitter.

In an embodiment, the base station processor determines the precoded data stream based by the following optimization problem:

$$\max_{Q_k} Tr\left[H_{kk} Q_k H_{kk}^T \left(\sigma^2 I + \sum_{l=1}^{K} H_{kl} Q_l H_{kl}^T\right)^{-1}\right]$$

s.t $Tr(Q_k) \leq p_k$   $Q_k \succeq 0$, where $H_{kk}$ is the matrix that denotes a relation between transmit signal and receive signal of user k, $H_{kl}$ is the channel matrix that shows the effect of user l's signal on user k's receiver, $Q_k$ is the covariance matrix for transmit signal for user k, $Q_l$ is the covariance matrix for transmit signal for user l, and $p_k$ is power budget for the transmit signal for user k.

In another embodiment, the base station processor determines the precoded data stream based by the following optimization problem:

$$\max_{Q_k} \alpha_k Tr\left[H_{kk} Q_k H_{kk}^T \left(\sigma^2 I + \sum_{l=1}^{K} H_{kl} Q_l H_{kl}^T\right)^{-1}\right] +$$

$$\sum_{j \neq k} \alpha_j Tr\left[H_{jj} Q_j H_{jj}^T \left(\sigma^2 I + \sum_{l=1}^{K} H_{jl} Q_l H_{jl}^T\right)^{-1}\right]$$

s.t $Tr(Q_k) \leq p_k$   $Q_k \succeq 0$, where $H_{kk}$ is the matrix denotes the relation between transmit signal and receive signal of user k, $H_{kl}$ is the channel matrix shows the effect of user l's signal on user k's receiver, $H_{jj}$ is channel matrix shows the relation between user j's transmit and receive signal, $H_{jl}$ is the channel matrix shows the effect of user l's signal on user j's receiver, $Q_k$ is the covariance matrix for transmit signal for user k, $Q_l$ is the covariance matrix for transmit signal for user l, and $p_k$ is a power limit for the transmit signal for user k.

In a further embodiment, the transmission device also includes a multi-output transmitter for transmitting the precoded data. In a further embodiment, the transmission device also includes a receiver, wherein the receiver is configured to obtain SINR values from the plurality of receivers.

Advantages of embodiments of the present invention include a utility function that leads to fairness among different data streams. It is also easy to find tight concave lower bounds for the utility function in some embodiments. Such a utility function makes the design of transmit covariance matrix possible such that the maximum degrees of freedom (DoF) is captured, and the interference channel alignment property is captured without a-priori knowledge of degrees of freedom in the channel. Furthermore, an embodiment utility function captures the interference alignment condition in high SNR regimes, as well as working effectively in all SNR range. In embodiments, no a-priori knowledge of the achievable degrees of freedom is needed because the transmit covariance matrix is used as a design parameter instead of linear precoders.

In embodiments that design the transmit covariance matrix instead of the beamformers, the algorithm can perform user selection and power allocation over different data streams. In some embodiments, the algorithm's behavior is similar to selfish approaches in low interference paradigm, and similar to interference alignment approaches in high interference case. The algorithm does user selection when all users cannot be served in embodiments. Furthermore, significant performance gain can be achieved.

In embodiments, optimization problems can be solved by using conventional techniques using various processing devices such as microprocessors, microcontrollers, computers, dedicated hardware, application specific integrated circuits (ASICs), general purpose integrated circuits, and digital signal processors (DSPs), for example.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Further information related to aspects of the present invention is provided in the paper on the following pages.

What is claimed is:

1. A method of operating a multi-output wireless transmitter, the method comprising:
   determining a precoded data stream in accordance with input data, the determining comprising,
      determining a signal to interference plus noise ratio (SNIR) of a plurality of receivers,
      determining a channel gain to each of the plurality of receivers, and
      maximizing a sum of utility functions without using a log detector, wherein each utility function is proportional to the SNIR of each of the plurality of receivers at low SNIR values and asymptotically approaches a constant value at high SNIR values; and
   transmitting the precoded data stream on the multi-output wireless transmitter, wherein determining the precoded data stream further comprises:
   updating auxiliary variable $W_k$ according to:

$$W_k = \left(I - H_{kk}Q_k H_{kk}^T \left(\sigma^2 I + \sum_{l=1}^{K} H_{kl} Q_l H_{kl}^T\right)^{-1}\right)^{-1}, \forall k = 1, 2, \ldots, K;$$

and solving the following optimization problem $$\min_{Q_k} \; Tr[B_k Q_k]$$

$$\text{s.t.} \; Tr(Q_k) \le p_k \; Q_k \succeq 0,$$

where $H_{kk}$ is a channel matrix from transmitter k (after the precoded data) to receiver k, K is a number of transmitters, $H_{kl}$ is a channel matrix from transmitter l (after the precoded data) to receiver k, $H_{jj}$ is a channel matrix from transmitter j (after the precoded data) to receiver j, $H_{jk}$ is a channel matrix from transmitter k (after the precoded data) to receiver j, $Q_k$ is a precoded transmit data covariance matrix of user k, $Q_l$ is a precoded transmit data covariance matrix of user l, $\tilde{Q}_k$ is a previous value for $Q_k$, $Q_j$ is a precoded transmit data covariance matrix of user j, and $p_k$ is a power constraint of precoded data of user k, $B_k$, represents received interference power from all receivers, I is an identity matrix and $\sigma$ is a noise standard deviation.

2. The method of claim 1, wherein each utility function is expressed as:

$$\frac{\gamma}{p + \gamma},$$

where p comprises a constant and $\gamma$ comprises a SNIR.

3. The method of claim 1, wherein the multi-output transmitter comprises a multi-antenna beam forming transmitter and a multi-time slot transmitter, and
   wherein the multi-output transmitter operates using multiple subcarriers.

4. The method of claim 1, further comprising receiving the transmitted precoded data stream with a linear minimum mean square error receiver.

5. The method of claim 1, wherein determining the precoded data stream is performed by a base station processor.

6. The method of claim 1, wherein determining the SNIR of a plurality of receivers comprises polling receivers.

7. A method of operating a multi-output wireless transmitter, the method comprising:
   determining a precoded data stream in accordance with input data, the determining comprising,
      determining a signal to interference plus noise ratio (SNIR) of a plurality of receivers,
      determining a channel gain to each of the plurality of receivers, and
      maximizing a sum of utility functions without using a log detector, wherein each utility function is proportional to the SNIR of each of the plurality of receivers at low SNIR values and asymptotically approaches a constant value at high SNIR values; and
   transmitting the precoded data stream on the multi-output wireless transmitter, wherein determining the precoded data stream further comprises solving the following optimization problem:

$$\max_{Q_k} \; Tr\left[H_{kk} Q_k H_{kk}^T \left(\sigma^2 I + \sum_{l=1}^{K} H_{kl} Q_l H_{kl}^T\right)^{-1}\right]$$

$$\text{s.t.} \; Tr(Q_k) \le p_k \; Q_k \succeq 0,$$

where $H_{kk}$ is a channel matrix from transmitter k (after the precoded data) to receiver k, $H_{kl}$ is a channel from transmitter l (after the precoded data) to receiver k, $Q_k$ is a precoded transmit data covariance matrix of user k, $Q_l$ is the precoded transmit data covariance matrix of user l, and $p_k$ is a power constraint of precoded data of user k, I is an identity matrix, $\sigma$ is a noise standard deviation, and the superscript T denotes a transpose operation in real signaling and hermitian transpose in complex signaling.

8. A method of operating a multi-output wireless transmitter, the method comprising:
   determining a precoded data stream in accordance with input data, the determining comprising,
      determining a signal to interference plus noise ratio (SNIR) of a plurality of receivers,
      determining a channel gain to each of the plurality of receivers, and
      maximizing a sum of utility functions without using a log detector, wherein each utility function is proportional to the SNIR of each of the plurality of receivers at low SNIR values and asymptotically approaches a constant value at high SNIR values; and
   transmitting the precoded data stream on the multi-output wireless transmitter, wherein determining the precoded data stream comprises solving the following optimization problem:

$$\max_{Q_k} \alpha_k Tr\left[H_{kk}Q_k H_{kk}^T\left(\sigma^2 I + \sum_{l=1}^{K} H_{kl}Q_l H_{kl}^T\right)^{-1}\right] +$$

$$\sum_{j\neq k} \alpha_j Tr\left[H_{jj}Q_j H_{jj}^T\left(\sigma^2 I + \sum_{l=1}^{K} H_{jl}Q_l H_{jl}^T\right)^{-1}\right]$$

s.t $Tr(Q_k) \leq p_k$ $Q_k \succeq 0$, where $H_{kk}$ is a channel matrix from transmitter k (after the precoded data) to receiver k, $H_{kl}$ is a channel matrix from transmitter l (after the precoded data) to receiver k, $H_{jj}$ is a channel matrix from transmitter j (after the precoded data) to receiver j, $H_{jl}$ is a channel matrix from transmitter l (after the precoded data) to receiver j, $Q_k$ is a precoded transmit data covariance matrix of user k, $Q_l$ is a precoded transmit data covariance matrix of user l, $Q_j$ is a precoded transmit data covariance matrix of user j, $p_k$ is a power constraint of precoded data of user k, I is an identity matrix, $\alpha_j$ is a priority weight of user j, $\alpha_k$ is a priority weight of user k, and σ is a noise standard deviation.

9. The method of claim 8, further comprising updating precoded transmit data covariance matrix $Q_k$ according to $$Q_k \leftarrow \alpha Q_k^* + (1-\alpha)\tilde{Q}_k,$$

where $0 < \alpha \leq 1$ is a regularization factor, $Q_k^*$ is a value found for the transmit covariance matrix after solving the optimization problem, and $\tilde{Q}_k$ is a previous value for the transmit covariance matrix $Q_k$.

10. A method of operating a multi-output wireless transmitter, the method comprising:
    determining a precoded data stream in accordance with input data, determining comprising,
        determining a signal to interference plus noise ratio (SNIR) of a plurality of receivers,
        determining a channel gain to each of the plurality of receivers, and
        maximizing a sum of utility functions without using a log detector, wherein each utility function is proportional to the SNIR of each of the plurality of receivers at low SNIR values and asymptotically approaches a constant value at high SNIR values; and
    transmitting the precoded data stream on the multi-output wireless transmitter, wherein determining the precoded data stream comprises solving the following optimization problem:

$$\min_{Q_k,Y} \alpha_k Tr[Y] + Tr[B_k Q_k]$$

s.t $Tr(Q_k) \leq p_k$, $Q_k \succeq 0$ $$\begin{bmatrix} C_{kk} + H_{kk}Q_k H_{kk}^T & (W_k C_{kk})^{\frac{1}{2}} \\ (W_k C_{kk})^{\frac{1}{2}} & Y \end{bmatrix} \succeq 0,$$

where, $$C_{k,k} \triangleq \sum_{l\neq k}^{K} H_{kl}Q_l H_{kl}^T$$

and $$B_k \triangleq \sum_{j\neq k} \alpha_j H_{jk}^T\left(C_{j,k} + H_{jk}\tilde{Q}_k H_{jk}^T\right)^{-1} W_j H_{jj} Q_j H_{jj}^T \left(C_{j,k} + H_{jk}\tilde{Q}_k H_{jk}^T\right)^{-1} H_{jk},$$

where $W_k$ is an auxilliary variable, $H_{kk}$ is a channel matrix from transmitter k (after the precoded data) to receiver k, $H_{kl}$ is a channel matrix from transmitter l (after the precoded data) to receiver k, $H_{jj}$ is a channel matrix from transmitter j (after the precoded data) to receiver j, $H_{jk}$ is a channel matrix from transmitter k (after the precoded data) to receiver j, $Q_k$ is a precoded transmit data covariance matrix of user k, $Q_l$ is a precoded transmit data covariance matrix of user l, $\tilde{Q}_k$ is a previous value for $Q_k$, $Q_j$ is a precoded transmit data covariance matrix of user j, and $p_k$ is a power constraint of precoded data of user k, $C_{k,k}$ represents received power, $C_{j,k}$ represents the received signal covariance matrix of receiver j excluding the k-th user's signal, $B_k$ represents received interference power from all receivers, $\alpha_j$ is a priority weight of user j, $\alpha_k$ is a priority weight of user k, and Y is an auxiliary variable.

11. The method according to claim 10, further comprising updating the auxiliary variable $W_k$ according to:

$$W_k = \left(I - H_{kk}Q_k H_{kk}^T\left(\sigma^2 I + \sum_{l=1}^{K} H_{kl}Q_l H_{kl}^T\right)^{-1}\right)^{-1}, \forall k = 1, 2, \ldots, K;$$

where K is a number of transmitters, σ is a noise standard deviation, and I is an identity matrix.

12. A method of operating a multi-output wireless transmitter, the method comprising:
    determining a precoded data stream in accordance with input data; and
    transmitting the precoded data stream on the multi-output wireless transmitter,
    wherein determining the precoded data stream comprises:
        determining a signal to interference plus noise ratio (SNIR) of a plurality of receivers;
        determining a channel gain to each of the plurality of receivers;
        maximizing a sum of utility functions, wherein each utility function is proportional to the SNIR of each of the plurality of receivers at low SNIR values and asymptotically approaches a constant value at high SNIR values; and
        solving the following optimization problem $$\min_{U,V,W} \sum_k \alpha_k(Tr[W_k E_k] - \log \det W_k),$$

where $E_k$ is a mean square error for used k according to $$E_k = (I - U_k^T H_{kk} V_k)(I - U_k^T H_{kk} V_k)^T + \sum_{j\neq k} U_k^T H_{kj} V_j V_j^T H_{kj}^T U_k + \sigma_k^2 U_k^T U_k,$$

where $V_k$ is a transmit beamformer, $U_k$ is a receive beamformer, $H_{kk}$ is a channel matrix from transmitter k (after the precoded data) to receiver k, $H_{kl}$ is a channel matrix from transmitter l (after the precoded data) to receiver k, σ is a noise standard deviation, and $W_k$ is an auxiliary variable.

13. The method according to claim 12, further comprising updating auxiliary variable $W_k$ according to: $W_k = (I - U_k^T H_{kk} V_k)^{-1}$,
where K is a number of transmitters, $Q_k$ is a precoded transmit data covariance matrix of user k, $Q_l$ is a precoded transmit data covariance matrix of user l, σ is a noise standard deviation, and I is an identity matrix.

14. The method of claim 12, further comprising using the following constraint when solving the optimization problem:

$$Tr(V_k V_k^T) \leq P_k,$$

where $P_k$ is a maximum available power of transmitter k.

15. A method of operating a wireless base station, the method comprising:
- determining a signal to interference plus noise ratio (SNIR) of a plurality of receivers;
- determining a channel gain to each of the plurality of receivers;
- determining a precoded data stream in accordance with input data, the determining comprising solving the following optimization problem:

$$\max_{Q_k} Tr\left[H_{kk} Q_k H_{kk}^T \left(\sigma^2 I + \sum_{l=1}^{K} H_{kl} Q_l H_{kl}^T\right)^{-1}\right]$$

$$\text{s.t } Tr(Q_k) \leq p_k \quad Q_k \succeq 0,$$

where $H_{kk}$ is a channel matrix from transmitter k (after the precoded data) to receiver k, $H_{kl}$ is a channel from transmitter l (after the precoded data) to receiver k, $Q_k$ is a precoded transmit data covariance matrix of user k, $Q_l$ is a precoded transmit data covariance matrix of user l, $p_k$ is a power constraint of precoded data of user k, I is an identity matrix and σ is a noise standard deviation; and
- transmitting the precoded data stream on a multi-output wireless transmitter.

16. The method of claim 15, wherein the multi-output wireless transmitter comprises a multi-antenna beam forming transmitter.

17. The method of claim 15, wherein at least one of the plurality of receivers comprises a cellular telephone.

18. A multi-output transmission device comprising:
a base station processor configured to:
determine a precoded data stream in accordance with input data;
- determine a signal to interference plus noise ratio (SNIR) of a plurality of receivers;
- determine a channel gain to each of the plurality of receivers; and
- maximize a sum of utility functions without using a log detector, wherein each utility function is proportional to the SNIR of each of the plurality of receivers at low SNIR values and asymptotically approaches a constant value at high SNIR values, and wherein the base station processor determines the precoded data stream by solving the following optimization problem:

$$\max_{Q_k} Tr\left[H_{kk} Q_k H_{kk}^T \left(\sigma^2 I + \sum_{l=1}^{K} H_{kl} Q_l H_{kl}^T\right)^{-1}\right]$$

$$\text{s.t } Tr(Q_k) \leq p_k \quad Q_k \succeq 0,$$

where $H_{kk}$ is a channel matrix from transmitter k (after the precoded data) to receiver k, $H_{kl}$ is a channel from transmitter l (after the precoded data) to receiver k, $Q_k$ is a precoded transmit data covariance matrix of user k, $Q_l$ is a precoded transmit data covariance matrix of user l, and $p_k$ is a power constraint of precoded data of user k, I is an identity matrix and σ is a noise standard deviation.

19. The transmission device of claim 18, wherein each utility function is expressed as:

$$\frac{\gamma}{p + \gamma},$$

where p comprises a constant and γ comprises a SNIR.

20. The transmission device of claim 18, wherein the multi-output transmission device comprises a multi-antenna beam forming transmitter and a multi-time slot transmitter, and
wherein the multi-output transmission device operates using multiple subcarriers.

21. The transmission device of claim 18, further comprising a multi-output transmitter for transmitting the precoded data.

22. The transmission device of claim 18, further comprising a receiver, the receiver configured to obtain SNIR values from the plurality of receivers.

23. A multi-output transmission device comprising:
a base station processor configured to:
- determine a precoded data stream in accordance with input data;
- determine a signal to interference plus noise ratio (SNIR) of a plurality of receivers;
- determine a channel gain to each of the plurality of receivers; and
maximize a sum of utility functions without using a log detector, wherein each utility function is proportional to the SNIR of each of the plurality of receivers at low SNIR values and asymptotically approaches a constant value at high SNIR values, and wherein the base station processor determines the precoded data stream by solving the following optimization problem:

$$\max_{Q_k} \alpha_k Tr\left[H_{kk} Q_k H_{kk}^T \left(\sigma^2 I + \sum_{l=1}^{K} H_{kl} Q_l H_{kl}^T\right)^{-1}\right] +$$

$$\sum_{j \neq k} \alpha_j Tr\left[H_{jj} Q_j H_{jj}^T \left(\sigma^2 I + \sum_{l=1}^{K} H_{jl} Q_l H_{jl}^T\right)^{-1}\right]$$

$$\text{s.t } Tr(Q_k) \leq p_k \quad Q_k \succeq 0,$$

where $H_{kk}$ is a channel matrix from transmitter k (after the precoded data) to receiver k, $H_{kl}$ is a channel matrix from transmitter l (after the precoded data) to receiver k, $H_{jj}$ is a channel matrix from transmitter j (after the precoded data) to receiver j, $H_{jl}$ is a channel matrix from transmitter l (after the precoded data) to receiver j, $Q_k$ is a precoded transmit data covariance matrix of user k, $Q_l$ is a precoded transmit data covariance matrix of user l, and $p_k$ is a power constraint of precoded data of user k, I is an identity matrix, $\alpha_j$ is a priority weight of user j, $\alpha_k$ is a priority weight of user k, and σ is a noise standard deviation.

* * * * *

UNITED STATES PATENT AND TRADEMARK OFFICE
CERTIFICATE OF CORRECTION

PATENT NO. : 8,577,310 B2  Page 1 of 1
APPLICATION NO. : 12/850319
DATED : November 5, 2013
INVENTOR(S) : Zhi-Quan Luo It is certified that error appears in the above-identified patent and that said Letters Patent is hereby corrected as shown below:

In the Specifications
Col. 4, line 18, Detailed Description of Illustrative Embodiments, after "transmitter can be" delete "a".
Col. 5, line 37, Detailed Description of Illustrative Embodiments, insert --,--.
In the Claims
Col. 15, line 13, claim 8, delete "transmitter/" and insert --transmitter I--.

Signed and Sealed this
Seventeenth Day of December, 2013

Margaret A. Focarino
*Commissioner for Patents of the United States Patent and Trademark Office*